(12) United States Patent
Mardel et al.

(10) Patent No.: US 10,800,929 B2
(45) Date of Patent: Oct. 13, 2020

(54) COMPOSITION FOR INHIBITING CORROSION

(71) Applicants: COMMONWEALTH SCIENTIFIC AND INDUSTRIAL RESEARCH ORGANISATION, Acton, Australian Capital Territory (AU); THE BOEING COMPANY, Chicago, IL (US)

(72) Inventors: James Ivan Mardel, Acton (AU); Ivan Stuart Cole, Acton (AU); Anthony Ewart Hughes, Acton (AU); Paul Andrew White, Acton (AU); Tracey Anne Markley, Acton (AU); Timothy Graham Harvey, Acton (AU); Joseph Osborne, Seattle, WA (US); Erik Sapper, Ballwin, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/562,826

(22) PCT Filed: Mar. 31, 2016

(86) PCT No.: PCT/AU2016/050245
§ 371 (c)(1),
(2) Date: Sep. 28, 2017

(87) PCT Pub. No.: WO2016/154680
PCT Pub. Date: Oct. 6, 2016

(65) Prior Publication Data
US 2018/0105702 A1    Apr. 19, 2018

Related U.S. Application Data

(60) Provisional application No. 62/141,084, filed on Mar. 31, 2015.

(51) Int. Cl.
*C09D 5/08* (2006.01)
*C09D 163/00* (2006.01)
(Continued)

(52) U.S. Cl.
CPC ............. *C09D 5/086* (2013.01); *C09D 5/038* (2013.01); *C09D 5/084* (2013.01); *C09D 163/00* (2013.01);
(Continued)

(58) Field of Classification Search
CPC ....................................................... C09D 5/038
See application file for complete search history.

(56) References Cited

U.S. PATENT DOCUMENTS 3,340,001 A    9/1967  Thornhill
3,714,067 A *  1/1973  King ...................... C23F 11/08
                                                       252/389.22
(Continued)

FOREIGN PATENT DOCUMENTS

EP    0330613 A2    8/1989
EP    2570515 A2    3/2013
(Continued)

OTHER PUBLICATIONS

Extended European Search Report for Application No. PCT/AU201605245 dated Nov. 12, 2018.
(Continued)

*Primary Examiner* — Peter F Godenschwager
(74) *Attorney, Agent, or Firm* — Patterson + Sheridan, LLP

(57) ABSTRACT

The present disclosure relates to agents, compositions, and methods for inhibiting corrosion in various substrates, for example in metal substrates. The present disclosure also relates to compositions for inhibiting corrosion comprising at least one organic heterocyclic compound and at least one (Continued)

metal salt or mixed metal salt selected from rare earth, alkali earth and transition metals.

19 Claims, 3 Drawing Sheets

(51) Int. Cl.
  *C23F 11/16* (2006.01)
  *C23F 11/18* (2006.01)
  *C23F 11/08* (2006.01)
  *C23F 11/14* (2006.01)
  *C09D 5/03* (2006.01)
  *C23C 22/56* (2006.01)

(52) U.S. Cl.
  CPC .............. *C23C 22/56* (2013.01); *C23F 11/08* (2013.01); *C23F 11/149* (2013.01); *C23F 11/161* (2013.01); *C23F 11/162* (2013.01); *C23F 11/165* (2013.01); *C23F 11/18* (2013.01); *C23F 11/185* (2013.01)

(56) References Cited

U.S. PATENT DOCUMENTS

| | | | |
|---|---|---|---|
| 4,098,720 A | 7/1978 | Hwa | |
| 4,329,381 A * | 5/1982 | Eschwey | C07D 277/72 106/14.37 |
| 5,567,534 A | 10/1996 | Yano et al. | |
| 5,747,439 A | 5/1998 | Dunn et al. | |
| 2004/0255819 A1 | 12/2004 | Sinko | |
| 2006/0091354 A1 | 5/2006 | van Ooij et al. | |
| 2010/0151253 A1 | 6/2010 | Roth et al. | |
| 2014/0315004 A1 | 10/2014 | Kinlen et al. | |

FOREIGN PATENT DOCUMENTS

| | | |
|---|---|---|
| WO | 1999/018044 A1 | 4/1999 |
| WO | 2001/071058 A1 | 9/2001 |
| WO | 2005/003408 A2 | 1/2005 |
| WO | 2007/008199 A1 | 1/2007 |
| WO | 2008/140648 A2 | 11/2008 |
| WO | 2014151570 A1 | 9/2014 |

OTHER PUBLICATIONS

Kina, A.Y. et al., "Inhibition of Carbon Steel CO2 Corrosion in High Salinity Solutions", Int. J. Electrochem. Sci., 2013, vol. 8, pp. 12600-12612.

Harvey, T.G. et al., "The Effect of Inhibitor Structure on the Corrosion of AA2024 and AA7075", Corrosion Science, 2011, vol. 53, pp. 2184-2190.

Muster, T. H. et al., "An Investigation of Rare Earth Chloride Mixtures: Combinatorial Optimisation for AA2024-t3 Corrosion Inhibition", Surface and Interface Analysis, 2010, vol. 42, pp. 170-174.

International Search Report and Written Opinion for International Application No. PCT/AU2016/050245 dated Jul. 1, 2016.

Chinese Office Action for Application No. 201680031304.1 dated Jul. 5, 2019.

Chinese Office Action for Application No. 201680031304.1 dated Mar. 16, 2020.

* cited by examiner

2024

Ce
Zn

Ce

Zn

COMPOSITION FOR INHIBITING CORROSION

CROSS-REFERENCE TO RELATED APPLICATIONS

This application is a National Stage application of PCT/AU2016/050245, filed Mar. 31, 2016, which claims benefit from U.S. Provisional Patent Application No. 62/141,084, filed Mar. 31, 2015, both of which are incorporated by reference in their entirety.

FIELD

The present disclosure relates to agents, compositions, and methods for inhibiting corrosion in various substrates, for example in metal substrates. The present disclosure also relates to compositions for inhibiting corrosion comprising at least one organic heterocyclic compound and at least one metal salt or mixed metal salt selected from rare earth, alkali earth and transition metals.

BACKGROUND

Protection of substrates, such as metal substrates, against atmospheric corrosion presents a difficult challenge and has significant economic importance. A range of metal substrates requiring protection from corrosion typically include aluminium alloys used in the aerospace industry, ferrous metals, zinc metals and alloys used for protective coatings.

Pigment grade corrosion inhibitors used in organic primers are well known to require anionic species with inhibitor activity that have limited, but effective, solubility in water. For these reasons, chromate based corrosion inhibitor species have been preferred in both corrosion control technologies applied on aluminium for protection against atmospheric corrosion, for example provided in conversion coatings and high performance organic primers. The hexavalent chromate ion has proven to be an excellent corrosion inhibitor for many metals and alloy systems for almost a decade. However, the toxic and carcinogenic nature of the chromate ion has been understood for some time and there has been extensive research for almost 30 years for finding environmentally acceptable replacements.

It is generally known that if toxicity, efficiency, and price are considered, the number of inorganic corrosion inhibitor species available for chromate replacement is limited essentially to a few anionic species, including molybdates, phosphates, borates, silicates and cyanamides. As a consequence, all commercial non-chromate corrosion inhibitor pigments are molybdates, phosphates, borates, silicates or cyanamides, or combinations of these compounds. In comparison to chromates, inherent limitations of their corrosion preventing mechanism render the anionic species less effective inhibitors of corrosion, in general, and specifically of atmospheric corrosion of aluminium. Consequently, it appears that inorganic chemistry is unable to produce inhibitors of atmospheric corrosion, which could be comparably effective, non-toxic alternative of the hexavalent chromate.

In contrast, a large array of organic corrosion inhibitors have been more recently known and applied in various corrosion control technologies. Excessive solubility in water and/or volatility of most of the known organic inhibitors are limitations when used in conversion coating technologies and in organic coatings.

Considerable progress has been made with identifying alternative corrosion inhibitors and the salts of transition metal and rare earth metals offer possible alternatives for many applications, including deoxidising and pickling solutions, etchants, anodizing and conversion coatings, primer paints and sealants. For example, cerium chloride was found in the early 80's (Hinton et al.) to be an excellent inhibitor for aluminium alloys. Alkali metal salts of carboxylic acids such as cinnamates have also been found to effectively inhibit the corrosion of mild steel.

The combination of rare earth metal ions with an effective organic inhibitor has also been found to suppress both anodic and cathodic reactions (i.e. a mixed inhibitor). For example, Behrouzvaziri et al. (2008) and Blin et al. (2007) have shown with electrochemical studies that lanthanum hydroxy cinnamate provides inhibition of corrosion in chloride solutions. For aluminium alloys, Ho et al. (2006) and Markley et al. (2007) demonstrated that cerium diphenyl phosphate and cerium dibutyl phosphate were very good inhibitors of corrosion of aluminium alloys. For example, U.S. Pat. No. 5,298,148 describes a range of powder coating formulations selected from the group consisting of lanthanum acetate, lanthanum butyrate, lanthanum oxalate, lanthanum nitrate, lanthanum hydroxide, lanthanum oxide, and lanthanum tungstate.

Organic compounds with aromatic character such as carbocyclic and heterocyclic aromatic structures have also been found to be effective inhibitors of corrosion of aluminium and its alloys, and for example, can be provided with metal salts or in the form of a metal complex. For example, WO2004/085551 relates to a corrosion inhibiting coating comprising a rare earth-based organic compound and/or a combination of a rare earth metal and an organic compound for coatings comprising an epoxy primer for the corrosion protection of metals. Most of the known alternative chromate based corrosion inhibitors suffer from various problems including poor corrosion inhibiting activity or incompatibility with various coating compositions.

There is a need for identifying alternative corrosion inhibitor compositions for protecting substrates, for example in metal substrates such as metal alloys, which are chromate-free corrosion inhibitor compositions.

SUMMARY

Research was undertaken to identify improved coating compositions and chromate-free corrosion inhibitors for protecting various substrates, such as metal substrates, from corrosion. During this research, it was identified that particular organic heterocyclic compounds comprising at least one exocyclic sulphur group, such as a thiol or thione group, could be advantageously used as a corrosion inhibiting agent in combination with rare earth, alkali earth and transition metal salts, in a corrosion inhibiting composition.

In one aspect, there is provided a method of protecting a substrate from corrosion comprising applying a corrosion inhibitor composition to the surface of a substrate, wherein the corrosion inhibitor composition comprises: at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Ca, Sr, Ba, Sc, and Zr; and at least one organic heterocyclic compound of Formula 1 or salt thereof:

Formula 1

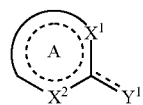

wherein

A is a 5- or 6-membered aryl, heteroaryl or heterocyclic ring, which is optionally substituted with one or more substituents and optionally fused with one or more aryl or heteroaryl rings, wherein a dotted line represents one or more optional double bonds;

$Y^1$ is selected from S or SH, wherein a dotted line represents a double bond when $Y^1$ is S or is absent when $Y^1$ is SH;

$X^1$ is selected from N, NH, O, and S;

$X^2$ is selected from N, $NR^5$, O, S, $CR^6$ and $CR^7R^8$; $R^5$ is selected from hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^6$, $R^7$ and $R^8$, are each independently selected from hydrogen, halo, thiol, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

For the organic heterocyclic compounds of Formula 1, $R^6$, $R^7$ and $R^8$, are each independently selected from hydrogen, halo, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

For the organic heterocyclic compounds of Formula 1, $Y^1$ may be SH. $X^1$ may be selected from N, NH, and S. $X^1$ may be selected from N and S. $X^1$ may be selected from N and NH. $X^2$ may be selected from N, NH, O, and S. $X^2$ may be selected from N, NH, and S. $X^2$ may be selected from N and NH. $X^1$ and $X^2$ may be each independently selected from N, NH and S. $X^1$ and $X^2$ may be each independently selected from N and NH. $X^1$ may be selected from N and NH, and $X^2$ may be selected from $CR^6$ and $CR^7R^8$.

For the organic heterocyclic compounds of Formula 1, $Y^1$ may be SH, and $X^1$ and $X^2$ may each be independently selected from N, NH, and S. $X^1$ may be further selected from N and S. $X^1$ may be further selected from N and NH. $X^2$ may be further selected from $CR^6$ and $CR^7R^8$. $X^2$ may be further selected from N, NH, and S. $X^2$ may be further selected from N and NH. $X^1$ and $X^2$ each may be further independently selected from N and NH.

The metals may be selected from at least one of Zn, Pr and Ce.

The substrate may be a metal substrate. It will be appreciated that the metal substrate can include any substrate material having at least a portion of its surface being metallic. The metal substrate may comprise any metal requiring protection from corrosion. The metal substrate may be copper-containing alloys, for example copper-containing aluminium alloys.

In another aspect, there is provided a corrosion inhibiting agent for protecting substrates from corrosion, wherein the corrosion inhibiting agent is an organic heterocyclic compound of Formula 1 as herein described, which may include any examples or embodiments thereof.

In another aspect, there is provided use of a composition comprising at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Ca, Sr, Ba, Sc, and Zr; and at least one organic heterocyclic compound of Formula 1 as herein described, which may include any examples or embodiments thereof, as a corrosion inhibitor, such as protecting substrates from corrosion.

In another aspect, there is provided a corrosion inhibitor composition comprising at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Ca, Sr, Ba, Sc, and Zr; and at least one organic heterocyclic compound of Formula 1 as herein described, which may include any examples or embodiments thereof.

The corrosion inhibitor composition may comprise a film-forming organic polymer. The composition may be a coating composition. The coating composition may be a powder coating composition, for example a powder coating composition suitable for use in powder coating of various steels. The coating composition may comprise one or more resins, for example epoxy based resins. The coating composition may be a paint composition, for example an epoxy resin based paint composition. The coating composition may be a spray composition. It will be appreciated that the compositions can include one or more additives, such as pigments, fillers and extenders.

In another aspect, there is provided a process for preparing a corrosion inhibitor composition for application to a substrate comprising forming a composition by admixing a film-forming organic polymer and a corrosion inhibitor composition as herein described, which may include any examples or embodiments thereof.

In another aspect, there is provided a coated substrate comprising a substrate coated with a corrosion inhibitor composition as herein described, which may include any examples or embodiments thereof. The coated substrate may comprise one or more layers of coatings applied to the substrate before and/or after the coating of the corrosion inhibitor composition. The corrosion inhibitor composition may be applied as a direct coating to the surface of the substrate. The corrosion inhibitor composition may comprise a film-forming organic polymer. The substrate may be a metal alloy. The coated substrate may be an aerospace component.

It will be appreciated that any one or more of the embodiments or examples as described above and herein for one aspect may also apply as embodiments to any other aspects described above.

BRIEF DESCRIPTION OF THE FIGURES

Some embodiments of the present disclosure are described and illustrated herein, by way of example only, with reference to the accompanying Figures in which.

DETAILED DESCRIPTION

Figure 1A:
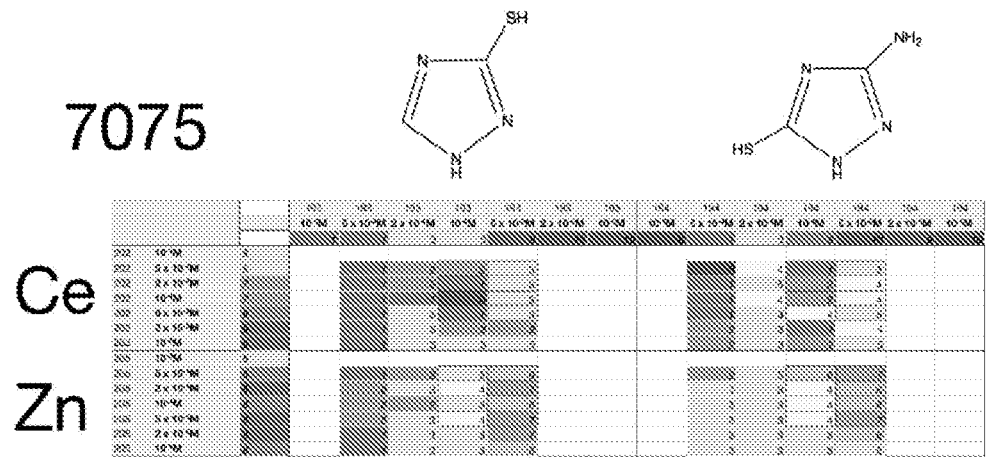
FIG. 1a is a table of corrosion values for a selection of corrosion inhibitor compositions for copper-containing aluminium alloy, AA7075.

The present disclosure describes the following various non-limiting examples, which relate to investigations undertaken to identify alternative chromate free corrosion inhibitors. It was surprisingly found that a selection of organic heterocyclic compounds comprising at least one exocyclic thiol or thione group were advantageously useful as corrosion inhibiting agents in combination with rare earth, alkali earth and transition metal salts, in a corrosion inhibiting composition. It was also surprisingly found that a selection of organic heterocyclic compounds comprising a single exocyclic thiol or thione group were advantageously useful as corrosion inhibiting agents that could also be further advantageously combined with rare earth, alkali earth and transition metal salts, in a corrosion inhibiting composition. Additionally, it was found that the combination of corrosion inhibiting agent and rare earth, alkali earth and transition metal salt provided synergistic results compared to results obtained when individual components were used separately at the same concentration allowing lower concentrations of both corrosion inhibiting agent and rare earth, alkali earth or transition metal salt to be used as part of a corrosion inhibiting composition. Surprisingly, various selections of organic heterocyclic compounds as described herein were also found to be less toxic than other known corrosion inhibiting organic heterocyclic compounds.

General Terms

As used herein, the term "substrate" refers to any structure that may require protection from corrosion and that can be cleaned and/or protected and/or modified to provide unique properties. The substrate may comprise at least a portion of its surface being metallic or being of any other material susceptible to corrosion. The substrate may be a metal substrate.

As used herein, the term "metal substrate" refers to a structure having at least a portion of its surface being metallic that can be cleaned and/or protected and/or modified to provide unique properties. A "metal substrate" is not limited to any particular type of metallic surface, and in terms of applying a corrosion inhibiting coating, such metal substrates typically include copper-containing alloys, for example copper-containing aluminium alloys.

As used herein, the term "protective composition" refers to any composition suitable for use in providing some form of corrosion protection to a substrate. For example, a protective composition can include a powder coating composition for use in protecting steel from corrosion, or a film-forming organic polymer based composition for protecting an aluminium alloy from corrosion.

As used herein, the term "extender" or "extender pigment" when used without qualification, refers to a type of pigment that is typically incorporated into a paint formulation to provide volume to the final resulting coating after paint curing, although it can be added for other reasons, such as to reduce cost. An extender can additionally or alternatively be an active component in making a total system more corrosion resistant. Extenders which add volume are often referred to as "fillers" or "extenders/fillers."

As used herein, the term "coating" refers to a polymeric material (organic or inorganic) that can be applied either as a liquid (e.g., paint) or solid (e.g., powder) to a substrate to form a polymeric film. Such polymeric materials include, but are not limited to, powder coatings, paints, sealants, conducting polymers, sol gels (e.g. Boegel™ made by Boeing Co. having offices in Chicago, Ill.), silicates, silicones, zirconates, titanates, and the like. A "coating" is comprised of a complex mixture of binders, solvents, pigments and additives. Many coatings have one or more substances from each of the four categories. Coating properties, such as gloss and color, are related to the film surface, for example as a two-dimensional entity. However, the bulk properties of a coating are related to its three-dimensional structure. Phase continuity is a volume concept, and the coating performance is dependent on the integrity of the binder phase.

As used herein, the term "film-forming organic polymer" or "film-forming polymeric material" refers to any polymeric material that can be used to make coatings, including monomers, co-monomers, resins or polymers. The polymeric material can also be referred to as a "binder", and can be either organic or inorganic. The organic polymeric material generally has a carbon backbone and the inorganic polymeric material generally has a silicone backbone. Organic binders are made up of organic monomers and oligomers from which the binders generally derive their names. Examples of these would be acrylic, epoxy, urethane, melamine, and so forth. Binders include epoxy-based resin binders such as a water reducible epoxy-polyamide system (for organic polymeric materials) or non-epoxy-based resin binders such as urethanes, ureas, acrylates, alkyds, melamines, polyesters, vinyls, vinyl esters, silicones, siloxanes, silicates, sulfides, silicate polymers, epoxy novolacs, epoxy phenolics, drying oils, hydrocarbon polymers, and the like.

As used herein, the term "weight percent (wt %)" when used without qualification, typically refers to the weight percent of a particular solid component, e.g., pigment, extender, etc., as compared with all solid components present, excluding polymeric resins. For example, if the only solid component present in the coating is a corrosion-inhibiting carbon pigment, the corrosion-inhibiting carbon pigment is considered to have a wt % of 100.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. The various embodiments disclosed and described in this specification can comprise, consist of, or consist essentially of the features and characteristics as variously described herein. The word "comprise", "comprises", or "comprising" includes those embodiments that "consist of" or "consist essentially of" the features and characteristics as variously described.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

Chemical Terms

As will be understood, an aromatic group means a cyclic group having $4m+2$ π electrons, where m is an integer equal to or greater than 1. As used herein, "aromatic" is used interchangeably with "aryl" to refer to an aromatic group, regardless of the valency of aromatic group. Thus, aryl refers to monovalent aromatic groups, bivalent aromatic groups and higher multivalency aromatic groups.

The term "joined" refers to a ring, moiety or group that is joined to at least one other ring, moiety or group by a single covalent bond.

The term "fused" refers to one or more rings that share at least two common ring atoms with one or more other rings.

A heteroaromatic group is an aromatic group or ring containing one or more heteroatoms, such as N, O, S, Se, Si or P. As used herein, "heteroaromatic" is used interchangeably with "heteroaryl", and a heteroaryl group refers to monovalent aromatic groups, bivalent aromatic groups and higher multivalency aromatic groups containing one or more heteroatoms.

The term "optionally substituted" means that a group is either substituted or unsubstituted, at any available position. Substitution can be with one or more groups selected from, e.g., alkyl, alkenyl, alkynyl, cycloalkyl, cycloalkenyl, aryl, heterocyclyl, heteroaryl, formyl, alkanoyl, cycloalkanoyl, aroyl, heteroaroyl, carboxyl, alkoxycarbonyl, cycloalkyloxycarbonyl, aryloxycarbonyl, heterocyclyloxycarbonyl, heteroaryloxycarbonyl, alkylaminocarbonyl, cycloalkylaminocarbonyl, arylaminocarbonyl, heterocyclylaminocarbonyl, heteroarylaminocarbonyl, cyano, alkoxy, cycloalkoxy, aryloxy, heterocyclyloxy, heteroaryloxy, alkanoate, cycloalkanoate, aryloate, heterocyclyloate, heteroaryloate, alkylcarbonylamino, cycloalkylcarbonylamino, arylcarbonylamino, heterocyclylcarbonylamino, heteroarylcarbonylamino, nitro, hydroxyl, halo, haloalkyl, haloaryl, haloheterocyclyl, haloheteroaryl, haloalkoxy, silylalkyl, alkenylsilylalkyl, alkynylsilylalkyl, and amino. The optional substitution may be one or more groups selected from halo, alkyl, formyl, and amino. The optional substituents may include salts of the groups, for example carboxylate salts. It will be appreciated that other groups not specifically described may also be used.

"Alkyl" whether used alone, or in compound words such as alkoxy, alkylthio, alkylamino, dialkylamino or haloalkyl, represents straight or branched chain hydrocarbons ranging in size from one to about 10 carbon atoms, or more. Thus alkyl moieties include, unless explicitly limited to smaller groups, moieties ranging in size, for example, from one to about 6 carbon atoms or greater, such as, methyl, ethyl, n-propyl, iso-propyl and/or butyl, pentyl, hexyl, and higher isomers, including, e.g., those straight or branched chain hydrocarbons ranging in size from about 6 to about 10 carbon atoms, or greater.

"Alkenyl" whether used alone, or in compound words such as alkenyloxy or haloalkenyl, represents straight or branched chain hydrocarbons containing at least one carbon-carbon double bond, including, unless explicitly limited to smaller groups, moieties ranging in size from two to about 6 carbon atoms or greater, such as, methylene, ethylene, 1-propenyl, 2-propenyl, and/or butenyl, pentenyl, hexenyl, and higher isomers, including, e.g., those straight or branched chain hydrocarbons ranging in size, for example, from about 6 to about 10 carbon atoms, or greater.

"Alkynyl" whether used alone, or in compound words such as alkynyloxy, represents straight or branched chain hydrocarbons containing at least one carbon-carbon triple bond, including, unless explicitly limited to smaller groups, moieties ranging in size from, e.g., two to about 6 carbon atoms or greater, such as, ethynyl, 1-propynyl, 2-propynyl, and/or butynyl, pentynyl, hexynyl, and higher isomers, including, e.g., those straight or branched chain hydrocarbons ranging in size from, e.g., about 6 to about 10 carbon atoms, or greater.

"Cycloalkyl" represents a mono- or polycarbocyclic ring system of varying sizes, e.g., from about 3 to about 10 carbon atoms, e.g., cyclopropyl, cyclobutyl, cyclopentyl, cyclohexyl or cycloheptyl. The term cycloalkyloxy represents the same groups linked through an oxygen atom such as cyclopentyloxy and cyclohexyloxy. The term cycloalkylthio represents the same groups linked through a sulfur atom such as cyclopentylthio and cyclohexylthio.

"Cycloalkenyl" represents a non-aromatic mono- or polycarbocyclic ring system, e.g., of about 3 to about 10 carbon atoms containing at least one carbon-carbon double bond, e.g., cyclopentenyl, cyclohexenyl or cycloheptenyl. The term "cycloalkenyloxy" represents the same groups linked through an oxygen atom such as cyclopentenyloxy and cyclohexenyloxy. The term "cycloalkenylthio" represents the same groups linked through a sulfur atom such as cyclopentenylthio and cyclohexenylthio.

The terms, "carbocyclic" and "carbocyclyl" represent a ring system wherein the ring atoms are all carbon atoms, e.g., of about 3 to about 10 carbon atoms, and which may be aromatic, non-aromatic, saturated, or unsaturated, and may be substituted and/or carry fused rings. Examples of such groups include benzene, cyclopentyl, cyclohexyl, or fully or partially hydrogenated phenyl, naphthyl and fluorenyl.

"Aryl" whether used alone, or in compound words such as arylalkyl, aryloxy or arylthio, represents: (i) an optionally substituted mono- or polycyclic aromatic carbocyclic moiety, e.g., of about 6 to about 60 carbon atoms, such as phenyl, naphthyl or fluorenyl; or, (ii) an optionally substituted partially saturated polycyclic carbocyclic aromatic ring system in which an aryl and a cycloalkyl or cycloalkenyl group are fused together to form a cyclic structure such as a tetrahydronaphthyl, indenyl, indanyl or fluorene ring.

"Heterocyclyl" or "heterocyclic" whether used alone, or in compound words such as heterocyclyloxy represents: (i) an optionally substituted cycloalkyl or cycloalkenyl group, e.g., of about 3 to about 60 ring members, which may contain one or more heteroatoms such as nitrogen, oxygen, or sulfur (examples include pyrrolidinyl, morpholino, thiomorpholino, or fully or partially hydrogenated thienyl, furyl, pyrrolyl, thiazolyl, oxazolyl, oxazinyl, thiazinyl, pyridyl and azepinyl); (ii) an optionally substituted partially saturated polycyclic ring system in which an aryl (or heteroaryl) ring and a heterocyclic group are fused together to form a cyclic structure (examples include chromanyl, dihydrobenzofuryl and indolinyl); or (iii) an optionally substituted fully or partially saturated polycyclic fused ring system that has one or more bridges (examples include quinuclidinyl and dihydro-1,4-epoxynaphthyl).

"Heteroaryl" or "hetaryl" whether used alone, or in compound words such as heteroaryloxy represents: (i) an optionally substituted mono- or polycyclic aromatic organic moiety, e.g., of about 1 to about 10 ring members in which one or more of the ring members is/are element(s) other than carbon, for example nitrogen, oxygen, sulfur or silicon; the heteroatom(s) interrupting a carbocyclic ring structure and having a sufficient number of delocalized pi electrons to provide aromatic character, provided that the rings do not contain adjacent oxygen and/or sulfur atoms. Typical 6-membered heteroaryl groups are pyrazinyl, pyridazinyl, pyrazolyl, pyridyl and pyrimidinyl. All regioisomers are contemplated, e.g., 2-pyridyl, 3-pyridyl and 4-pyridyl. Typical 5-membered heteroaryl rings are furyl, imidazolyl, oxazolyl, isoxazolyl, isothiazolyl, oxadiazolyl, pyrrolyl, 1,3,4-thiadiazolyl, thiazolyl, thienyl, triazolyl, and silole. All regioisomers are contemplated, e.g., 2-thienyl and 3-thienyl. Bicyclic groups typically are benzo-fused ring systems derived from the heteroaryl groups named above, e.g., benzofuryl, benzimidazolyl, benzthiazolyl, indolyl, indolizinyl, isoquinolyl, quinazolinyl, quinolyl and benzothienyl; or, (ii) an optionally substituted partially saturated polycyclic heteroaryl ring system in which a heteroaryl and a cycloalkyl or cycloalkenyl group are fused together to form a cyclic structure such as a tetrahydroquinolyl or pyrindinyl ring.

"Formyl" represents a —CHO moiety.

"Alkanoyl" represents a —C(=O)-alkyl group in which the alkyl group is as defined supra. An alkanoyl group may range in size from about $C_2$-$C_{20}$. One example is acyl.

"Aroyl" represents a —C(=O)-aryl group in which the aryl group is as defined supra. An aroyl group may range in size from about $C_7$-$C_{20}$. Examples include benzoyl and 1-naphthoyl and 2-naphthoyl.

"Heterocycloyl" represents a —C(=O)-heterocyclyl group in which the heterocylic group is as defined supra. An heterocycloyl may range in size from about $C_4$-$C_{20}$.

"Heteroaroyl" represents a —C(=O)-heteroaryl group in which the heteroaryl group is as defined supra. A heteroaroyl group may range in size from about $C_6$-$C_{20}$. An example is pyridylcarbonyl.

"Carboxyl" represents a —$CO_2$H moiety.

"Oxycarbonyl" represents a carboxylic acid ester group —$CO_2$R which is linked to the rest of the molecule through a carbon atom.

"Alkoxycarbonyl" represents an —$CO_2$-alkyl group in which the alkyl group is as defined supra. An alkoxycarbonyl group may range in size from about $C_2$-$C_{20}$. Examples include methoxycarbonyl and ethoxycarbonyl.

"Aryloxycarbonyl" represents an —$CO_2$-aryl group in which the aryl group is as defined supra. Examples include phenoxycarbonyl and naphthoxycarbonyl.

"Heterocyclyloxycarbonyl" represents a —$CO_2$-heterocyclyl group in which the heterocyclic group is as defined supra.

"Heteroaryloxycarbonyl" represents a —$CO_2$-heteroaryl group in which the heteroaryl group is as defined supra.

"Aminocarbonyl" represents a carboxylic acid amide group —C(=O)NHR or —C(=O)$NR_2$ which is linked to the rest of the molecule through a carbon atom.

"Alkylaminocarbonyl" represents a —C(=O)NHR or —C(=O)$NR_2$ group in which R is an alkyl group as defined supra.

"Arylaminocarbonyl" represents a —C(=O)NHR or —C(=O)$NR_2$ group in which R is an aryl group as defined supra.

"Heterocyclylaminocarbonyl" represents a —C(=O)NHR or —C(=O)$NR_2$ group in which R is a heterocyclic group as defined supra. $NR_2$ may for example be a heterocyclic ring, which is optionally substituted.

"Heteroarylaminocarbonyl" represents a —C(=O)NHR or —C(=O)$NR_2$ group in which R is a heteroaryl group as defined supra. $NR_2$ may for example be a heteroaryl ring, which is optionally substituted.

"Cyano" represents a —CN moiety.

"Hydroxyl" represents a —OH moiety.

"Alkoxy" represents an —O-alkyl group in which the alkyl group is as defined supra. Examples include methoxy, ethoxy, n-propoxy, iso-propoxy, and the different butoxy, pentoxy, hexyloxy and higher isomers.

"Aryloxy" represents an —O-aryl group in which the aryl group is as defined supra. Examples include, without limitation, phenoxy and naphthoxy.

"Alkenyloxy" represents an —O-alkenyl group in which the alkenyl group is as defined supra. An example is allyloxy.

"Heterocyclyloxy" represents an —O-heterocyclyl group in which the heterocyclic group is as defined supra.

"Heteroaryloxy" represents an —O-heteroaryl group in which the heteroaryl group is as defined supra. An example is pyridyloxy.

"Alkanoate" represents an —OC(=O)—R group in which R is an alkyl group as defined supra.

"Aryloate" represents a —OC(=O)—R group in which R is an aryl group as defined supra.

"Heterocycloate" represents an —OC(=O)—R group in which R is a heterocyclic group as defined supra.

"Heteroaryloate" represents an —OC(=O)—R group in which P is a heteroaryl group as defined supra.

"Amino" represents an —$NH_2$ moiety.

"Alkylamino" represents an —NHR or —$NR_2$ group in which R is an alkyl group as defined supra. Examples include, without limitation, methylamino, ethylamino, n-propylamino, isopropylamino, and the different butylamino, pentylamino, hexylamino and higher isomers.

"Arylamino" represents an —NHR or —$NR_2$ group in which R is an aryl group as defined supra. An example is phenylamino.

"Heterocyclylamino" represents an —NHR or —$NR_2$ group in which R is a heterocyclic group as defined supra. $NR_2$ may for example be a heterocyclic ring, which is optionally substituted.

"Heteroarylamino" represents a —NHR or —$NR_2$ group in which R is a heteroaryl group as defined supra. $NR_2$ may for example be a heteroaryl ring, which is optionally substituted.

"Carbonylamino" represents a carboxylic acid amide group —NHC(=O)R that is linked to the rest of the molecule through a nitrogen atom.

"Alkylcarbonylamino" represents a —NHC(=O)R group in which R is an alkyl group as defined supra.

"Arylcarbonylamino" represents an —NHC(=O)R group in which R is an aryl group as defined supra.

"Heterocyclylcarbonylamino" represents an —NHC(=O)R group in which R is a heterocyclic group as defined supra.

"Heteroarylcarbonylamino" represents an —NHC(=O)R group in which R is a heteroaryl group as defined supra.

"Nitro" represents a —$NO_2$ moiety.

"Aldehyde" represents a —C(=O)H group.

"Alkanal" represents an alkyl-(C=O)H group in which the alkyl group is as defined supra.

"Alkylsilyl" represents an alkyl group that is linked to the rest of the molecule through the silicon atom, which may be substituted with up to three independently selected alkyl groups in which each alkyl group is as defined supra.

"Alkenylsilyl" presents an alkenyl group that is linked to the rest of the molecule through the silicon atom, which may be substituted with up to three independently selected alkenyl groups in which each alkenyl group is as defined supra.

"Alkynylsilyl" presents an alkynyl group that is linked to the rest of the molecule through the silicon atom, which may be substituted with up to three independently selected alkynyl groups in which each alkenyl group is as defined supra.

The term "halo" or "halogen" whether employed alone or in compound words such as haloalkyl, haloalkoxy or haloalkylsulfonyl, represents fluorine, chlorine, bromine or iodine. Further, when used in compound words such as haloalkyl, haloalkoxy or haloalkylsulfonyl, the alkyl may be partially halogenated or fully substituted with halogen atoms which may be independently the same or different.

Examples of haloalkyl include, without limitation, —$CH_2CH_2F$, —$CF_2CF_3$ and —$CH_2CHFCl$. Examples of haloalkoxy include, without limitation, —$OCHF_2$, —$OCF_3$, —$OCH_2CCl_3$, —$OCH_2CF_3$ and —$OCH_2CH_2CF_3$.

Examples of haloalkylsulfonyl include, without limitation, —$SO_2CF_3$, —$SO_2CCl_3$, —$SO_2CH_2CF_3$ and —$SO_2CF_2CF_3$.

The terms "thiol", "thio", "mercapto" or "mercaptan" refer to any organosulphur group containing a sulphurhydryl moiety —SH, which includes a R—SH group where R is a moiety containing a carbon atom for coordination to the —SH moiety, for example an alkylsulphur group as defined supra. For example, the thiol or mercapto group may be a sulphurhydryl moiety —SH.

The terms "thione", "thioketones" or "thiocarbonyls" refer to any organosulphur group containing a —C=S moiety, which includes a R—C=S group, for example where R is an alky group defined supra. For example, the thione group may be a —C=S moiety.

The term "exocyclic" refers to an atom or group that is attached externally to a cyclic ring system of a heteroaryl or heterocyclic compound, which contrasts with an "endocyclic" atom or group that is within the ring system such that the atoms form a part of the ring system of the heteroaryl or heterocyclic compound.

The compounds described herein may include salts, solvates, hydrates, isomers, tautomers, racemates, stereoisomers, enantiomers or diastereoisomers of those compounds. For example salts may include sodium, potassium, calcium, nitrates, phosphates, sulphates, and chlorides. In one embodiment the compounds include salts thereof selected from sodium salts.

Corrosion Inhibiting Agents

The corrosion inhibiting agents of the present disclosure may be selected from at least one organic heterocyclic compound comprising at least one exocyclic sulphur group, for example a thiol or thione group. The corrosion inhibiting agents of the present disclosure may also be selected from at least one organic heterocyclic compound comprising a single exocyclic sulphur group, for example a thiol or thione group. The organic heterocyclic compounds may be each optionally substituted and optionally fused with one or more substituents or groups. The organic heterocyclic compounds may be selected from an optionally substituted, optionally fused, heteroaryl or heterocyclic compound comprising at least one exocyclic thiol or thione group. The organic heterocyclic compound may be selected from optionally substituted heteroaryl or heterocyclic compound comprising at least one exocyclic thiol or thione group and at least one endocyclic heteroatom selected from N, O and S. The organic heterocyclic compound may include salts of the at least one exocyclic thiol groups, for example, thiol sodium salt.

The one or more organic heterocyclic compounds may each be selected from an optionally substituted, optionally fused, 5 or 6-membered mono or bicyclic heteroaryl or heterocyclic compound comprising at least one exocyclic sulphur group selected from a thiol and thione. The exocyclic sulphur group may be a thiol.

The at least one organic heterocyclic compound may be selected from a compound of Formula 1 or salt thereof:

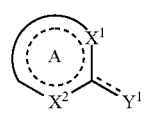

Formula 1 wherein

A is a 5- or 6-membered aryl, heteroaryl or heterocyclic ring, which is optionally substituted with one or more substituents and optionally fused with one or more aryl or heteroaryl rings, wherein a dotted line represents one or more optional double bonds;

$Y^1$ is selected from S or SH, wherein a dotted line represents a double bond when $Y^1$ is S or is absent when $Y^1$ is SH;

$X^1$ is selected from N, NH, O, and S; $X^2$ is selected from N, $NR^5$, O, S, $CR^6$ and $CR^7R^8$;

$R^5$ is selected from hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^6$, $R^7$ and $R^8$, are each independently selected from hydrogen, halo, thiol, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

For the organic heterocyclic compounds of Formula 1, $Y^1$ may be SH. $X^1$ may be selected from N, NH, and S. $X^1$ may be selected from N and S. $X^1$ may be selected from N and NH. $X^2$ may be selected from N, NH, O, and S. $X^2$ may be selected from N, NH, and S. $X^2$ may be selected from N and NH. $X^1$ and $X^2$ may be each independently selected from N, NH and S. $X^1$ and $X^2$ may be each independently selected from N and NH. $X^1$ may be selected from N and NH, and $X^2$ may be selected from $CR^6$ and $CR^7R^8$.

For the organic heterocyclic compounds of Formula 1, $Y^1$ may be SH, and $X^1$ and $X^2$ may each be independently selected from N, NH, and S. $X^1$ may be further selected from N and S. $X^1$ may be further selected from N and NH. $X^2$ may be further selected from $CR^6$ and $CR^7R^8$. $X^2$ may be further selected from N, NH, and S. $X^2$ may be further selected from N and NH. $X^1$ and $X^2$ each may be further independently selected from N and NH.

Optionally fused groups of ring A may be monocyclic or polycyclic. Optional fused groups of the A ring may be optionally substituted mono- or bicyclic aryl, heteroaryl or heterocyclic ring, for example where a compound of Formula 1 is a bicyclic compound. The monocyclic aryl groups may be an optionally substituted 6 membered ring, such as benzene. The polycyclic aryl groups may be two or more optionally substituted 6-member rings fused together, such as naphthalene, anthracene, pyrene, tetracene, and pentacene. The heteroaryl groups may be selected from 5-membered monocyclic rings, such as thiophene, furan, pyrrole, silole, imidazole, 1,3-thiazole, 1,3,4-oxadiazole, 1,3,4-thiadiazole, or 6 membered rings, such as pyridine and triazine, wherein each ring may be optionally substituted.

Optional substituents of ring A ring may be selected from halo, cyano, amino, hydroxy, alkanoic acid, alkanoate salt, carbamoyl, $C_1$-$C_{10}$alkyloxycarbonyl, $C_1$-$C_{10}$alkyl, $C_1$-$C_{10}$haloalkyl, $C_1$-$C_{10}$alkylamino, $C_3$-$C_{10}$cycloalkyl, $C_2$-$C_{10}$alkenyl, $C_3$-$C_{10}$cycloalkenyl, $C_2$-$C_{10}$alkynyl, $C_3$-$C_{10}$cycloalkynyl, aryl and aryl$C_1$-$C_{10}$alkyl, heteroaryl and heteroaryl$C_1$-$C_{10}$alkyl, $C_1$-$C_{10}$alkyloxy, $C_3$-$C_{10}$cycloalkyloxy and wherein amino, alkanoic acid, alkanoic salt, alkyloxycarbonyl, alkyl, haloalkyl, alkylamino, cycloalkyl, alkenyl, cycloalkenyl, alkynyl, cycloalkynyl, aryl, arylalkyl, heteroaryl, heteroarylalkyl, alkyloxy and cycloalkyloxy in each occurrence may be optionally substituted, for example further substituted with one or more of halo, hydroxyl, amino, nitro, carboxylic acid. The optional substitution may be any one or more groups selected from halo, alkyl, formyl, and amino. The optional substituents may include salts of the functional groups, for example carboxylate salts.

Ring A may be heterocyclic, for example an unsaturated heterocyclic compound. Ring A may be heteroaromatic or partially unsaturated. For example, ring A may contain one or more double bonds between ring atoms. Ring A may also contain one or more optional substituents and optional fused groups. Ring A may be a monocyclic 5 or 6 membered heteroaryl or heterocyclic ring. Ring A may be a bicyclic ring comprising two rings joined together that are each independently selected from 5 and 6 membered rings. Ring A may be a bicyclic ring comprising two rings fused together that are each independently selected from 5 and 6 membered rings. Ring A may be a bicyclic heteroaryl or heterocyclic ring containing a 5 membered heterocyclic ring fused to a 6 membered aryl, carbocyclic, heterocyclic or heteroaryl ring.

A further advantage can be provided when the at least one organic heterocyclic compound selected from a compound of Formula 1 or salt thereof provides a single exocyclic thiol or thione group. For example, the at least one organic heterocyclic compound may be selected from a compound of Formula 1 or salt thereof:

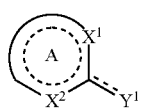

Formula 1 wherein

A is a 5- or 6-membered aryl, heteroaryl or heterocyclic ring, which is optionally substituted with one or more substituents and optionally fused with one or more aryl or heteroaryl rings, wherein a dotted line represents one or more optional double bonds;

$Y^1$ is selected from S or SH, wherein a dotted line represents a double bond when $Y^1$ is S or is absent when $Y^1$ is SH;

$X^1$ is selected from N, NH, O, and S;

$X^2$ is selected from N, $NR^5$, O, S, $CR^6$ and $CR^7R^8$;

$R^5$ is selected from hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^6$, $R^7$ and $R^8$, are each independently selected from hydrogen, halo, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

For the organic heterocyclic compounds of Formula 1, $Y^1$ may be SH. $X^1$ may be selected from N, NH, and S. $X^1$ may be selected from N and S. $X^1$ may be selected from N and NH. $X^2$ may be selected from N, NH, O, and S. $X^2$ may be selected from N, NH, and S. $X^2$ may be selected from N and NH. $X^1$ and $X^2$ may be each independently selected from N, NH and S. $X^1$ and $X^2$ may be each independently selected from N and NH. $X^1$ may be selected from N and NH, and $X^2$ may be selected from $CR^6$ and $CR^7R^8$.

For the organic heterocyclic compounds of Formula 1, $Y^1$ may be SH, and $X^1$ and $X^2$ may each be independently selected from N, NH, and S. $X^1$ may be further selected from N and S. $X^1$ may be further selected from N and NH. $X^2$ may be further selected from $CR^6$ and $CR^7R^8$. $X^2$ may be further selected from N, NH, and S. $X^2$ may be further selected from N and NH. $X^1$ and $X^2$ each may be further independently selected from N and NH.

Optionally fused groups of ring A may be monocyclic or polycyclic. Optional fused groups of the A ring may be optionally substituted mono- or bicyclic aryl, heteroaryl or heterocyclic ring, for example where a compound of Formula 1a is a bicyclic compound. The monocyclic aryl groups may be an optionally substituted 6 membered ring, such as benzene. The polycyclic aryl groups may be two or more optionally substituted 6-member rings fused together, such as naphthalene, anthracene, pyrene, tetracene, and pentacene. The heteroaryl groups may be selected from 5-membered monocyclic rings, such as thiophene, furan, pyrrole, silole, imidazole, 1,3-thiazole, 1,3,4-oxadiazole, 1,3,4-thiadiazole, or 6 membered rings, such as pyridine and triazine, wherein each ring may be optionally substituted.

Optional substituents of ring A ring may be selected from halo, cyano, amino, hydroxy, alkanoic acid, alkanoate salt, carbamoyl, $C_1$-$C_{10}$alkyloxycarbonyl, $C_1$-$C_{10}$alkyl, $C_1$-$C_{10}$haloalkyl, $C_1$-$C_{10}$alkylamino, $C_3$-$C_{10}$cycloalkyl, $C_2$-$C_{10}$alkenyl, $C_3$-$C_{10}$cycloalkenyl, $C_2$-$C_{10}$alkynyl, $C_3$-$C_{10}$cycloalkynyl, aryl and aryl$C_1$-$C_{10}$alkyl, heteroaryl and heteroaryl$C_1$-$C_{10}$alkyl, $C_1$-$C_{10}$alkyloxy, $C_3$-$C_{10}$cycloalkyloxy and wherein amino, alkanoic acid, alkanoic salt, alkyloxycarbonyl, alkyl, haloalkyl, alkylamino, cycloalkyl, alkenyl, cycloalkenyl, alkynyl, cycloalkynyl, aryl, arylalkyl, heteroaryl, heteroarylalkyl, alkyloxy and cycloalkyloxy in each occurrence may be optionally substituted, for example further substituted with one or more of halo, hydroxyl, amino, nitro, carboxylic acid. The optional substitution may be any one or more groups selected from halo, alkyl, formyl, and amino. The optional substituents may include salts of the functional groups, for example carboxylate salts.

Ring A may be heterocyclic, for example an unsaturated heterocyclic compound. Ring A may be heteroaromatic or partially unsaturated. For example, ring A may contain one or more double bonds between ring atoms. Ring A may also contain one or more optional substituents and optional fused groups. Ring A may be a monocyclic 5 or 6 membered heteroaryl or heterocyclic ring. Ring A may be a bicyclic ring comprising two rings joined together that are each independently selected from 5 and 6 membered rings. Ring A may be a bicyclic ring comprising two rings fused together that are each independently selected from 5 and 6 membered rings. Ring A may be a bicyclic heteroaryl or heterocyclic ring containing a 5 membered heterocyclic ring fused to a 6 membered aryl, carbocyclic, heterocyclic or heteroaryl ring.

The at least one organic heterocyclic compound may be selected from a compound of Formula 1(a) or salts thereof:

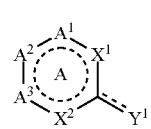

Formula 1(a)

wherein

A, $Y^1$, $X^1$ and $X^2$ are defined according to Formula 1 as described above;

$A^1$, $A^2$ and $A^3$ are each independently selected from C=O, C=S, N, $NR^{13}$, O, S, $SO_2$, $CR^{14}$, $CR^{15}R^{16}$;

$R^{13}$ is selected from hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^{14}$, $R^{15}$ and $R^{16}$, are each independently selected from hydrogen, halo, thiol, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted, and optionally two of $R^{13}$, $R^{14}$, $R^{15}$ and $R^{16}$, join together to form an optionally substituted aryl or heteroaryl ring fused to the A ring.

In an embodiment, $A^1$ and $A^3$ are $CR^{14}$. In another embodiment, $R^{14}$ is selected from amino and thiol. In another embodiment, $A^1$ and $A^3$ are each independently selected from C—SH and C—NH$_2$. In another embodiment, $A^1$ and $A^3$ are C—SH. In another embodiment, $Y^1$ is SH. In another embodiment, $X^1$ and $X^2$ are N. In another embodiment, $A^2$ is N. Some specific examples of compounds of Formula 1(a) are provided as follows:

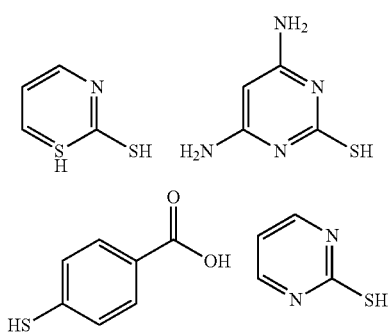

The at least one organic heterocyclic compound may be selected from a compound of Formula 1(a)(i) or salts thereof:

Formula 1(a)(i)

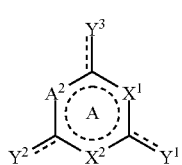

wherein

A is a 5- or 6-membered aryl, heteroaryl or heterocyclic ring, which is optionally substituted with one or more substituents and optionally fused with one or more aryl or heteroaryl rings, wherein a dotted line represents one or more optional double bonds;

$A^2$, $X^1$ and $X^2$ are each independently selected from N, NH, O, and S;

$Y^1$, $Y^2$ and $Y^3$ are each independently selected from S or SH, wherein the dotted line represents a double bond when $Y^1$ is S or is absent when $Y^1$ is SH;

$X^1$ and $X^2$ are defined according to Formula 1 as described above;

$A^1$, $A^2$ and $A^3$ are each independently selected from C=O, C=S, N, NR$^{13}$, O, S, SO$_2$, CR$^{14}$, CR$^{15}$R$^{16}$; and $R^{15}$ and $R^{16}$ are defined according to Formula 1a as described above.

In an embodiment, $A^2$, $X^1$ and $X^2$ are N. In another embodiment, $Y^1$, $Y^2$ and $Y^3$ are SH.

Some specific examples of compounds of Formula 1(a)(i) are provided as follows:

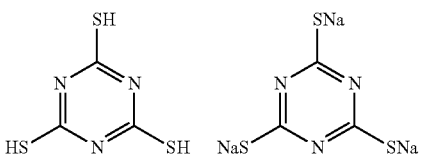

Further advantages may be provided by a single exocyclic thiol or thione group, including salts thereof. In one embodiment, the at least one organic heterocyclic compound may be selected from a compound of Formula 1(b) or salt thereof:

Formula 1(b)

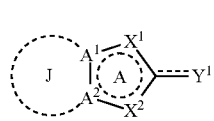

wherein

A ring is an optionally substituted 5-membered heterocyclic ring, wherein a dotted line represents one or more optional double bonds;

$X^1$, $X^2$ and $Y^1$ are defined according to Formula 1 as described above;

$A^1$ and $A^2$ are each independently selected from C=O, C=S, N, NR$^{13}$, O, S, SO$_2$, CR$^{14}$ and CR$^{15}$R$^{16}$; and are optionally joined together to form an optionally substituted aryl, heteroaryl or heterocyclic ring J that is fused to the A ring;

$R^{13}$ is selected from hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^{14}$, $R^{15}$ and $R^{16}$, are each independently selected from hydrogen, halo, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted, and optionally two of $R^{13}$, $R^{14}$, $R^{15}$ and $R^{16}$, join together to form an optionally substituted aryl or heteroaryl ring fused to the A ring.

Some specific examples of compounds of Formula 1(b) are provided as follows:

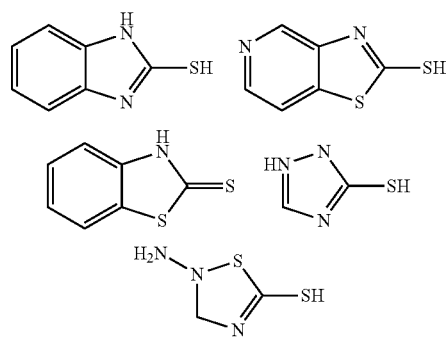

The at least one organic heterocyclic compound may be selected from a compound of Formula 1(b)(i) or salt thereof:

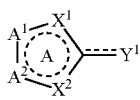

Formula 1(b)(i)

wherein

A ring is an optionally substituted 5-membered heterocyclic ring, wherein a dotted line represents one or more optional double bonds;

$X^1$, $X^2$ and $Y^1$ are defined according to Formula 1b as described above;

$A^1$ and $A^2$ are each independently selected from N, $NR^{13}$, O, S, $CR^{14}$ and $CR^{15}R^{16}$;

$R^{13}$ is selected from hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^{15}$ and $R^{16}$ are defined according to Formula 1b as described above.

Some specific examples of compounds of Formula 1(b)(i) are provided as follows:

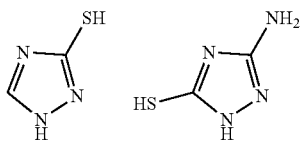 [SMILES: Sc1nc[nH]n1 ; Nc1n[nH]c(S)n1]

The at least one organic heterocyclic compound may be selected from a compound of Formula 1(b)(ii) or salt thereof:

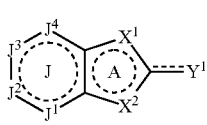

Formula 1(b)(ii)

wherein

A ring is an optionally substituted 5-membered heterocyclic ring and J ring is an optionally substituted 6-membered aryl or heterocyclic ring, wherein a dotted line represents one or more optional double bonds;

$X^1$, $X^2$ and $Y^1$ are defined according to Formula 1a as described above;

$J^1$, $J^2$, $J^3$ and $J^4$ are each independently selected from N, $NR^{13}$, O, S, $CR^{14}$ and $CR^{15}R^{16}$;

$R^{13}$ is selected from hydrogen, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted; and $R^{14}$, $R^{15}$ and $R^{16}$, are each independently selected from hydrogen, halo, amino, $C_1$-$C_{10}$alkyl, $C_2$-$C_{10}$alkenyl, $C_2$-$C_{10}$alkynyl, aryl and heteroaryl, in which each amino, alkyl, alkenyl, alkynyl, aryl or heteroaryl group may be optionally substituted.

Some specific examples of compounds of Formula 1(b)(ii) are provided as follows:

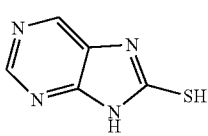

It will be appreciated that any of the embodiments or examples described above or herein for Formula 1 may also provide embodiments for any compounds of Formula 1(a), 1(a)(i), 1(b), 1(b)(i) or 1(b)(ii).

The organic compounds may exist as one or more stereoisomers. The various stereoisomers can include enantiomers, diastereomers and geometric isomers. Those skilled in the art will appreciate that one stereoisomer may be more active than the other(s). In addition, the skilled person would know how to separate such stereoisomers. Accordingly, the present disclosure comprises mixtures, individual stereoisomers, and optically active mixtures of the compounds described herein.

Some specific examples of heteroaryl and heterocyclic organic compounds of Formula 1 are shown in Table 1 as follows:

TABLE 1

| Ref. No. | Chemical Name | Chemical Structure |
|---|---|---|
| 1 | 2-mercaptobenzimidazole (MBI) | |
| 2 | 3a,4-dihydrothiazolo[4,5-c]pyridine-2-thiol | |
| 3 | benzo[d]thiazole-2(3H)-thione | |
| 4 | 1,2,4-triazole-3-thiol | |
| 5 | 2-amino, 5-mercapto-1,2,4-thiadiazole | |
| 6 | 5-methyl-2-mercapto-1,3,4-thiadiazole | |
| 7 | 4-amino-5-phenyl-3-mercapto-1,2,4-triazole | |
| 8 | 5-mercapto-1-tetrazole-1H-acetic acid, sodium salt | |

TABLE 1-continued

| Ref. No. | Chemical Name | Chemical Structure |
|---|---|---|
| 9 | 4,6-diamino-2-mercaptopyrimidine | |
| 10 | 4-amino-2-mercaptopyrimidine | |
| 11 | 2,6-diamino-4-mercaptopyrimidine | |
| 12 | 9H-purine-8-thiol | |
| 13 | 1H-imidazo[4,5-b]pyrazine-2-thiol | |
| 14 | S-triazolo-[4,3-a]-pyridine-3-thione | |
| 15 | 2-mercaptobenzimidazole | |
| 16 | 1,2,4-triazole-3-thiol | |
| 17 | 3-amino-5-mercapto-1,2,4,-triazole | |
| 18 | 2-mercaptopyrimidine | |
| 19 | 2-mercaptonicotinate, sodium salt | |
| 20 | 4-mercaptobenzoate, sodium salt | |
| 21 | 6-mercaptonicotinate, sodium salt | |
| 22 | 1,3,5-triazine-2,4,6-trithiol | |
| 23 | 1,3,5-triazine-2,4,6-trithiol, trisodium salt | |

Metal Salts

The metal salts or mixed metal salts of the corrosion inhibiting compositions may be selected from alkali earth metals, transition metals and rare earth metal salts, for example a group consisting of Zn, La, Pr, Nd, Sm, Eu, Gd, Tb, Dy, Ho, Er, Tm, Yb, Lu, Ce, Co, Y, Bi, Cd, Pb, Ag, Sb, Sn, Cu, Fe, Ni, Li, Ca, Sr, Mg, Zr, Nd, Ba, Sc, and any combinations thereof. The corrosion inhibitor compositions may comprise at least one metal salt or mixed metal salt, wherein the metal is selected from the group consisting of Zn, La, Pr, Ce, Co, Y, Ca, Sr, Ba, Sc, and Zr. It will be appreciated that a mixed metal salt may be provided by a combination comprising two or more metals. For example, the mixed metal salt may comprise two or more metals selected from any two or more of Zn, La, Pr, Nd, Sm, Eu, Gd, Tb, Dy, Ho, Er, Tm, Yb, Lu, Ce, Co, Y, Bi, Cd, Pb, Ag, Sb, Sn, Cu, Fe, Ni, Li, Ca, Sr, Mg, Zr, Nd, Ba, and Sc. The metals may be selected from at least one of Zn, Pr and Ce. The metal may be Zn. The metal may be Ce. The metal may be Pr. Some examples of salts that may be used are nitrate, chloride and acetate salts. It will be appreciated that the metals may have different oxidation states. For example, the typical oxidation state for Zn is +2. The typical oxidation states for Pr are +2, +3 and/or +4. The typical oxidation states for Ce are +2, +3 and +4. It will be appreciated that various combinations and groups of the above mentioned metal salts or mixed metal salts, may be used in the compositions of the present disclosure.

Substrates for Corrosion Protection

Substrates that may be protected from corrosion by the corrosion inhibiting agents or compositions thereof as described herein may be metal substrates. It will be appreciated that the metal substrate can include any substrate material having at least a portion of its surface being metallic, for example a portion of its external surface being metallic. The metal substrate may comprise any metal requiring protection from corrosion. The metal substrate may comprise a metal or alloy selected from aluminium, for example aluminium alloys. The metal substrate may be an aluminium alloy, for example alloys of aluminium with one or more metals selected from the group consisting of copper, magnesium, manganese, silicon, tin and zinc. The aluminium alloys may be an alloy comprising copper. The metal substrate may be a copper-containing alloy, such as copper-containing aluminium alloy. The amount of copper in the alloy may be less than about 20%, less than about 18%, less than about 16%, less than about 14%, less than about 12%, less than about 10%, less than about 8%, or less than about 6%. The aluminium alloy may be an aerospace alloy, for example AA2XXX and AA7XXX type. For example the aluminium alloy may be AA2024 and AA7075 type. The aluminium alloy may be an automotive alloy, for example AA6XXX type. The aluminium alloy may be a marine alloy, for example AA5XXX type.

Compositions and Formulations

The present disclosure also relates to compositions for inhibiting corrosion comprising (a) at least one organic heterocyclic compound of Formula 1 as described herein and (b) at least one metal selected from rare earth, alkali earth and transition metals, as described herein, or any embodiments thereof. It will be appreciated that reference to any combination of (a) and (b) in the composition described herein refers to the individual components of (a) and (b) together in one composition and not reaction products thereof.

For example, the corrosion inhibitor compositions may comprise (a) at least one organic heterocyclic compound of Formula 1 as described herein or any embodiments thereof and (b) at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Ca, Sr, Ba, Sc, and Zr. For example, the at least one metal may be any one of Zn, Ce and Pr; the at least one metal may be Zn; the at least one metal may be Ce; or the at least one metal may be Pr.

The corrosion inhibitor composition may comprise (a) at least one organic heterocyclic compound of Formula 1(a) or salt thereof, as described herein or any embodiments thereof and (b) at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Ca, Sr, Ba, Sc, and Zr.

The corrosion inhibitor composition may comprise (a) at least one organic heterocyclic compound of Formula 1(a)(i) or salt thereof, as described herein or any embodiments thereof and (b) at least one metal salt or mixed metal salt, wherein the metal is selected from the group consisting of Zn, Pr and Ce.

The corrosion inhibitor composition may comprise (a) at least one organic heterocyclic compound of Formula 1(b) or salt thereof, as described herein or any embodiments thereof and (b) at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Ca, Sr, Ba, Sc, and Zr.

The corrosion inhibitor composition may comprise (a) at least one organic heterocyclic compound of Formula 1(b)(i) or salt thereof, as described herein or any embodiments thereof and (b) at least one metal salt or mixed metal salt, wherein the metal is selected from the group consisting of Zn, Pr and Ce.

The corrosion inhibitor composition may comprise (a) at least one organic heterocyclic compound of Formula 1(b)(ii) or salt thereof, as described herein or any embodiments thereof and (b) at least one metal salt or mixed metal salt, wherein the metal is selected from the group consisting of Zn, Pr and Ce.

Further advantages can be achieved wherein the concentration of the corrosion inhibiting agents and metal salts or mixed metal salts are provided at various concentration and ratio ranges. The concentration of the corrosion inhibiting agent when used in combination with a metal salt or mixed metal salt may be less than about $5 \times 10^{-1}$ M, less than about $2 \times 10^{-1}$ M, less than about $10^{-1}$ M, less than about $5 \times 10^{-2}$ M, less than about $2 \times 10^{-2}$ M, less than about $10^{-2}$ M, less than about $5 \times 10^{-3}$ M, less than about $2 \times 10^{-3}$ M, or less than about $10^{-3}$ M. The concentration range of the corrosion inhibiting agent when used in combination with a metal salt or mixed metal salt may be from about $5 \times 10^{-1}$ M to about $10^{-8}$ M, from about $2 \times 10^{-1}$ M to about $2 \times 10^{-8}$ M, from about $10^{-1}$ M to about $5 \times 10^{-8}$ M, from about $5 \times 10^{-2}$ M to about $10^{-7}$ M, from about $2 \times 10^{-2}$ M to about $2 \times 10^{-7}$ M, from about $10^{-2}$ M to about $5 \times 10^{-7}$ M, from about $5 \times 10^{-3}$ M to about $10^{-6}$ M, from about $2 \times 10^{-3}$ M to about $2 \times 10^{-6}$ M, from about $10^{-3}$ M to about $5 \times 10^{-6}$ M, or from about $5 \times 10^{-4}$ M to about $10^{-5}$ M. The concentration of the metal salt or mixed metal salt when used in combination with a corrosion inhibiting agent may be less than about $5 \times 10^{-1}$ M, less than about $2 \times 10^{-1}$ M, less than about $10^{-1}$ M, less than about $5 \times 10^{-2}$ M, less than about $2 \times 10^{-2}$ M, less than about $10^{-2}$ M, less than about $5 \times 10^{-3}$ M, less than about $2 \times 10^{-3}$ M, or less than about $10^{-3}$ M. The concentration range of the metal salt or mixed metal salt when used in combination with a corrosion inhibiting agent may be from about $5 \times 10^{-1}$ M to about $10^{-8}$ M, from about $2 \times 10^{-1}$ M to about $2 \times 10^{-8}$ M, from about $10^{-1}$ M to about $5 \times 10^{-8}$ M, from about $5 \times 10^{-2}$ M to about $10^{-7}$ M, from about $2 \times 10^{-2}$ M to about $2 \times 10^{-7}$ M, from about $10^{-2}$ M to about $5 \times 10^{-7}$ M, from about $5 \times 10^{-3}$ M to about $10^{-6}$ M, from about $2 \times 10^{-3}$ M to about $2 \times 10^{-6}$ M, from about $10^{-3}$ M to about $5 \times 10^{-6}$ M, or from about $5 \times 10^{-4}$ M to about $10^{-5}$ M.

In one embodiment, the ratio of metal salt:corrosion inhibiting agent in the corrosion inhibitor composition is provided with an excess of the metal salt in comparison to the corrosion inhibiting agent. For example, the ratio of metal salt:corrosion inhibiting agent in the corrosion inhibitor composition may be greater than about 1:1, greater than about 1.1:1, greater than about 1.2:1, greater than about 1.3:1, greater than about 1.4:1, greater than about 1.5:1, greater than about 1.6:1, greater than about 1.7:1, greater than about 1.8:1, greater than about 1.9:1, greater than about 2:1, greater than about 3:1, greater than about 4:1, greater than about 5:1, greater than about 6:1, greater than about 7:1, greater than about 8:1, greater than about 9:1, or greater than about 10:1. The ratio of metal salt:corrosion inhibiting agent in the corrosion inhibitor composition may be less than about 45:1, less than about 40:1, less than about 35:1, less than about 30:1, less than about 25:1, less than about 20:1, less than about 15:1, or less than about 10:1. The ratio of metal salt:corrosion inhibiting agent in the corrosion inhibitor composition may be provided in a range of greater than about 1:1 to about 45:1, about 1.5:1 to about 40:1, about 2:1 to about 35:1, about 2.5:1 to about 30:1, about 3:1 to about 25:1, about 3.5:1 to about 20:1, about 4:1 to about 15:1, or about 5:1 to about 10:1. For example, the ratio of metal salt:corrosion inhibiting agent in the corrosion inhibitor composition may be provided in a range of about 1.1:1 to about 45:1, about 1.2:1 to about 40:1, about 1.3:1 to about 35:1, about 1.4:1 to about 30:1, about 1.5:1 to about 25:1, about 1.6:1 to about 20:1, about 1.7:1 to about 15:1, about 1.8:1 to about 10:1, about 1.9:1 to about 9:1, or about 2:1 to about 8:1.

The corrosion inhibitor compositions are suitable for use and application to various substrates, such as metal substrates, and for example can be provided as coating compositions. The compositions may include one or more other additives or corrosion inhibiting agents suitable for particular use with a type of substrate.

The corrosion inhibiting composition can be a coating composition comprising a film-forming organic polymer. The coating composition may be a paint composition. The coating composition may comprise one or more resins, for example epoxy based resins. The coating composition may be a paint composition, for example an epoxy resin based paint composition.

The coating composition may be a powder coating composition, for example a powder coating composition suitable for use in powder coating of various metal substrates including aluminium alloys as described herein or steels.

The coating composition may be a spray composition.

The coating compositions can be applied to a substrate, in either a wet or "not fully cured" condition that dries or cures over time, that is, solvent evaporates. The coatings can dry or cure either naturally or by accelerated means, for example an ultraviolet light cured system to form a film or "cured" paint. The coatings can also be applied in a semi or fully cured state, such as an adhesive.

The corrosion inhibiting composition can also be an encapsulated corrosion inhibiting composition. The encapsulated corrosion inhibiting composition may comprise at least one polymeric film encapsulating the at least one organic heterocyclic compound of Formula 1 as described herein and at least one metal salt or mixed metal salt, wherein the metal is selected from rare earth, alkali earth and transition metals, as described herein, or any embodiments thereof. For example, the encapsulated corrosion inhibitor compositions may comprise at least one polymeric film; at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Ca, Sr, Ba, Sc, and Zr; and at least one organic heterocyclic compound of Formula 1 as described herein or any embodiments thereof. The polymeric film may include a predetermined thickness and permeability to permit controlled diffusion of the particle ions upon interaction with water.

The corrosion inhibiting composition may be a corrosion inhibiting kit. The corrosion inhibiting kit may comprise two or more components and for example include instructions that the compounds are mixed prior to application onto a metal substrate. For example a first component may be at least one organic heterocyclic compound of Formula 1 as described herein and at least one metal salt or mixed metal salt, wherein the metal is selected from rare earth, alkali earth and transition metals, as described herein, or any embodiments thereof; and a second component may be a coating composition, for example a paint composition. The paint composition may be an epoxy based paint composition. A third component may be an additive, for example a hardener for the resin or any additive described herein.

The compositions may include a list of ingredients, and/or components, and can also include a list of instructions for preparing and mixing together the ingredients, and/or components to make a coating composition.

It will be appreciated that the compositions can include one or more additives, such as pigments, fillers and extenders. Examples of suitable additives with which the corrosion inhibitors described herein can be combined include, for example, binders, solvents, pigments (including soluble or non-soluble extenders, fillers, corrosion-inhibiting pigments, and the like), solvents, additives (e.g., curing agents, surfactants, dyes, amino acids and the like), and so forth. Note that some additives can also properly be considered a pigment and vice versa (e.g., matting agents). More specifically, these "additives" include, but are not limited to, glycine, arginine, methionine, and derivatives of amino acids, such as methionine sulfoxide, methyl sulfoxide, and iodides/iodates, gelatin and gelatin derivatives, such as animal and fish gelatins, linear and cyclic dextrins, including alpha and beta cyclodextrin, triflic acid, triflates, acetates, talc, kaolin, organic-based ionic exchange resins, such as organic-based cationic and anionic exchange resins, organic-based ionic exchange resins, such as organic-based cationic and anionic exchange resins, organic-based ionic exchange resins that have been pre-exchanged or reacted with the salts, oxides, and/or mixed oxides of rare earth material, and metal sulfates, such as sulfates of rare earth materials, magnesium sulfate, calcium sulfate (anhydrous and hydrated forms), strontium sulfate, barium sulfate, and the like, and combinations thereof.

It will be appreciated that the compositions may comprise, or consist of any one or more of the components or additives described herein.

The compositions may also include other additives such as rheology modifiers, fillers, tougheners, thermal or UV stabilizers, fire retardants, lubricants, surface active agents. The additive(s) are usually present in an amount of less than about 10% based on the total weight of the activation treatment or the combination of solvent(s), agent(s) and additive(s). Examples include:

(a) rheology modifiers such as hydroxypropyl methyl cellulose (e.g. Methocell 311, Dow), modified urea (e.g. Byk 411, 410) and polyhydroxycarboxylic acid amides (e.g. Byk 405);

(b) film formers such as esters of dicarboxylic acid (e.g. Lusolvan FBH, BASF) and glycol ethers (e.g. Dowanol, Dow);

(c) wetting agents such as fluorochemical surfactants (e.g. 3M Fluorad) and polyether modified poly-dimethyl-siloxane (e.g. Byk 307, 333);

(d) surfactants such as fatty acid derivatives (e.g. Bermadol SPS 2543, Akzo) and quaternary ammonium salts;

(e) dispersants such as non-ionic surfactants based on primary alcohols (e.g. Merpol 4481, Dupont) and alkylphenol-formaldehyde-bisulfide condensates (e.g. Clariants 1494);

(f) anti foaming agents;

(g) anti corrosion reagents such as phosphate esters (e.g. ADD APT, Anticor C6), alkylammonium salt of (2-benzothiazolythio) succinic acid (e.g. Irgacor 153 CIBA) and triazine dithiols;

(h) stabilizers such as benzimidazole derivatives (e.g. Bayer, Preventol BCM, biocidal film protection);

(i) leveling agents such as fluorocarbon-modified polymers (e.g. EFKA 3777);

(j) pigments or dyes such as fluorescents (Royale Pigment and chemicals);

(k) organic and inorganic dyes such as fluoroscein; and (l) Lewis acids such as lithium chloride, zinc chloride, strontium chloride, calcium chloride and aluminium chloride.

(m) Suitable flame retardants which retard flame propagation, heat release and/or smoke generation which may be added singularly or optionally include:

Phosphorus derivatives such as molecules containing phosphate, polyphosphate, phosphites, phosphazine and phosphine functional groups, for example, melamine phosphate, dimelamine phosphate, melamine polyphosphate, ammonia phosphate, ammonia polyphosphate, pentaerythritol phosphate, melamine phosphite and triphenyl phosphine.

Nitrogen containing derivatives such as melamine, melamine cyanurate, melamine phthalate, melamine phthalimide, melam, melem, melon, melam cyanurate, melem cyanurate, melon cyanurate, hexamethylene tetraamine, imidazole, adenine, guanine, cytosine and thymine.

Molecules containing borate functional groups such as ammonia borate and zinc borate.

Molecules containing two or more alcohol groups such as pentaerythritol, polyethylene alcohol, polyglycols and carbohydrates, for example, glucose, sucrose and starch.

Molecules which endothermically release non-combustible decomposition gases, such as, metal hydroxides, for example, magnesium hydroxide and aluminum hydroxide.

Expandable graphite.

Method of Selecting Corrosion Inhibitor Compositions

The present disclosure also relates to a method for selecting corrosion inhibitor compositions for inhibiting corrosion.

The main goal in the method is to establish a selection of (a) at least one organic heterocyclic compound of Formula 1 as described herein; and (b) at least one metal salt or mixed metal salt, wherein the metal is selected from rare earth, alkali earth and transition metals, as described herein, or any embodiments thereof, using a high throughput screening technique.

The rapid screening method provides the following advantages: (1) it is rapid, for example it reduces the time per experiment and increases the number of experiments per unit time, (2) it reduces the preparation time per experiment and also reduces the time taken for the analysis of results and (3) it correlates with existing corrosion standards or testing methods. From an environmental viewpoint, the amount of material and solutions used and requiring disposal is significantly reduced using the described rapid screening method.

The rapid screening of corrosion inhibitor compositions may take place in a sodium chloride (NaCl) solution and at room temperature for 24 hours in an eighty-eight well polydimethylsiloxane block (PDMS) brought into contact with the surface of a metal substrate. The metal substrate may be a copper-containing alloy, such as copper-containing aluminium alloy. The NaCl solutions may be prepared at concentrations from about $10^{-1}$ to about $10^{-6}$ M.

The rapid screening test allows for corrosion analysis of the corrosion inhibitor compositions through imaging. Image processing is important for this technique because of the need to capture all of the corrosion damage in one image for processing. The semi-quantitative image analysis technique simultaneously analyses the corrosion to match the corrosion seen visually. Two photographs of the sample under different lighting conditions are combined using layers and inverse images in Adobe PhotoShop® to convert the resulting corrosion to a brightness value and then sample mask and background mask images are created for analysis. The observed corrosion is converted to corrosion values over a 0-10 scale with repetitions over 4 plates and multiple repetitions per plate consistently within 10% of each other.

EXAMPLES

In order that the present disclosure may be more clearly understood, embodiments of the disclosure are described in further detail below by reference to the following non-limiting experimental materials, methodologies, and examples.

General Procedure for the Rapid Screening of Corrosion Inhibitor Compositions

The corrosion inhibitor compositions include a mixture of at least one metal salt or mixed metal salt with at least one corrosion inhibiting agent, as described herein. Each metal salt or mixed metal salt was added into solution of 0.1 M NaCl in deionised water at a concentration of $10^{-3}$ M, $5\times10^{-4}$ M, $2\times10^{-4}$ M, $10^{-4}$ M, $5\times10^{-5}$ M, $2\times10^{-5}$ M, and $10^{-5}$ M. Each corrosion inhibiting agent was added into solution of 0.1 M NaCl in deionised water at a concentration of $10^{-3}$ M, $5\times10^{-4}$ M, $2\times10^{-4}$ M, $10^{-4}$ M, $5\times10^{-5}$ M, $2\times10^{-5}$ M, and $10^{-5}$ M.

A final volume of 200 μL of the corrosion inhibitor composition were added to an eighty-eight well polydimethylsiloxane block (PDMS) brought into contact with a surface of a metal substrate. The corrosion inhibitor compositions comprise various combinations of metal salt or mixed metal salt with corrosion inhibiting agent, wherein the ranges include between 1:1 to 45:1 of metal salt: corrosion inhibiting agent.

The corrosion experiments were then allowed to proceed for 24 hours at room temperature (20° C.). During the experiment the holes were loosely covered with a plastic film to prevent the corrosion inhibitor compositions from evaporation while allowing diffusion of air.

At the end of the 24 hour period, the assembly was inverted, the corrosion inhibitor compositions discarded and each well washed with deionized water. The assembly was disassembled and the PDMS rubber removed. The corrosion circles on the plate were washed again and excess liquid removed with compressed air. The metal substrate was left to dry for 12 hour in a desiccator containing self-indicating silica gel at room temperature before imaging.

Two photographs of the sample under different lighting conditions are combined using layers and inverse images in Adobe PhotoShop® to convert the resulting corrosion to a brightness value and then sample mask and background mask images are created for analysis. The brightness values were ranked from 0 (darkest, least amount of corrosion) to 100 (brightest, most amount of corrosion). The observed corrosion is converted to corrosion values over a 0-10 scale with repetitions over 4 plates and multiple repetitions per plate consistently within 10% of each other. Typically, a value of 0 represents the least amount of corrosion and a value of 10 represents the most amount of corrosion.

Figure 1B:
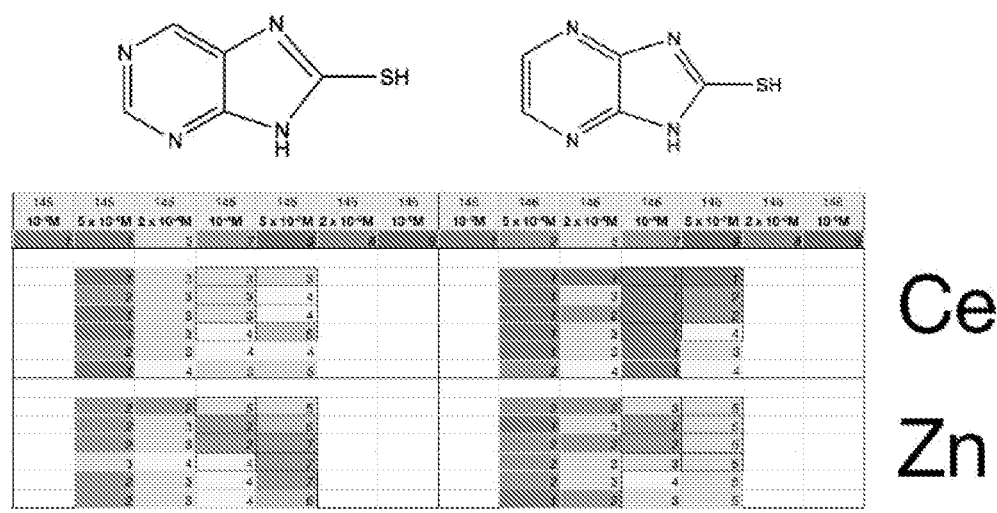
FIG. 1b is a table of corrosion values for a selection of corrosion inhibitor compositions for copper-containing aluminium alloy, AA7075.

In FIG. 1a and FIG. 1b a table of corrosion values over a 0-10 scale from the 24 hour wells rapid screening method for various corrosion inhibitor compositions is shown. The selection of corrosion inhibitor composition is selected from (a) corrosion inhibiting agents of Formula 1, compounds 12, 13, 16, and 17, and (b) metal salt or mixed metal salt, Ce and Zn, as described herein, and provided at various concentrations. Comparison corrosion values are also shown for the same selection of corrosion inhibiting agents and metal salts or mixed metal salts. FIG. 1a and FIG. 1b shows the rapid screening method performed on the copper-containing aluminium alloy, AA7075. The concentration of the metal salts shown in FIG. 1b are the same as the concentration of the metal salts shown in FIG. 1a.

Figure 2A:
FIG. 2a is a table of corrosion values for a selection of corrosion inhibitor compositions for copper-containing aluminium alloy, AA2024.
Figure 2A:
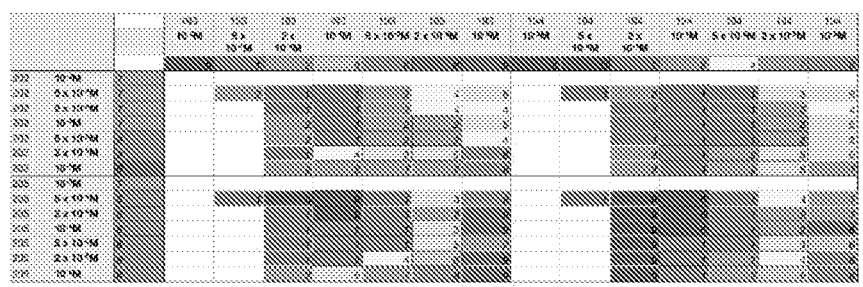
Figure 2B:
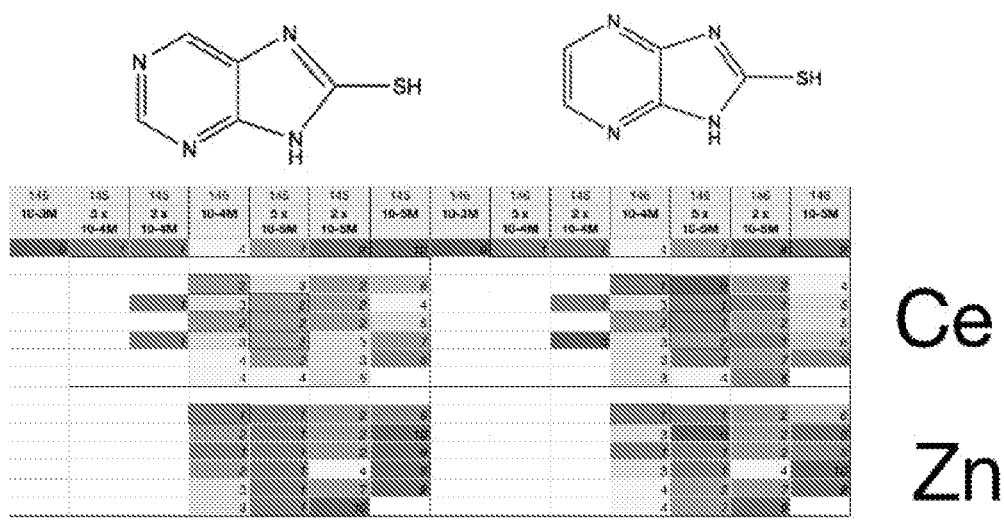
FIG. 2b is a table of corrosion values for a selection of corrosion inhibitor compositions for copper-containing aluminium alloy, AA2024.

In FIG. 2a and FIG. 2b a table of corrosion values over a 0-10 scale from the 24 hour wells rapid screening method for various corrosion inhibitor compositions is shown. The selection of corrosion inhibitor composition is selected from (a) corrosion inhibiting agents of Formula 1, compounds 12, 13, 16, and 17, and (b) metal salts, Ce and Zn as described herein, and provided at various concentrations. Comparison corrosion values are also shown for the same selection of corrosion inhibiting agents and metal salt or mixed metal salt. FIG. 2a and FIG. 2b shows the rapid screening method performed on a copper-containing aluminium alloy, AA2024. The concentration of the metal salts shown in FIG. 2b are the same as the concentration of the metal salts shown in FIG. 2a.

Example 1a $CeCl_3.7H_2O$ and Compound 16 was prepared and transferred to the eighty-eighty well PDMS brought into contact with AA7075 type metal substrate, and analysed according to the general process described above. FIG. 1a shows that the combination provides results supporting advantages provided by the combination, which are particularly synergistic across various concentration ranges.

Example 1b $ZnCl_2$ and Compound 16 was prepared and transferred to the eighty-eighty well PDMS brought into contact with AA7075 type metal substrate, and analysed according to the general process described above. FIG. 1a shows that the combination provides results supporting advantages provided by the combination, which are particularly synergistic across various concentration ranges.

Example 2a $CeCl_3.7H_2O$ and Compound 17 was prepared and transferred to the eighty-eighty well PDMS brought into contact with AA7075 type metal substrate, and analysed according to the general process described above. FIG. 1a shows that the combination provides results supporting advantages provided by the combination, which are particularly synergistic across various concentration ranges.

Example 2b $ZnCl_2$ and Compound 17 was prepared and transferred to the eighty-eighty well PDMS brought into contact with AA7075 type metal substrate, and analysed according to the general process described above. FIG. 1a shows that the combination provides results supporting advantages provided by the combination, which are particularly synergistic across various concentration ranges.

Example 3a $CeCl_3.7H_2O$ and Compound 12 was prepared and transferred to the eighty-eighty well PDMS brought into contact with AA7075 type metal substrate, and analysed according to the general process described above. FIG. 1b shows that the combination provides results supporting advantages provided by the combination, which are particularly synergistic across various concentration ranges.

Example 3b $ZnCl_2$ and Compound 12 was prepared and transferred to the eighty-eighty well PDMS brought into contact with AA7075 type metal substrate, and analysed according to the general process described above. FIG. 1b shows that the combination provides results supporting advantages provided by the combination, which are particularly synergistic across various concentration ranges.

Example 4a $CeCl_3.7H_2O$ and Compound 13 was prepared and transferred to the eighty-eighty well PDMS brought into contact with AA7075 type metal substrate, and analysed according to the general process described above. FIG. 1b shows that the combination provides results supporting advantages provided by the combination, which are particularly synergistic across various concentration ranges.

Example 4b $ZnCl_2$ and Compound 13 was prepared and transferred to the eighty-eighty well PDMS brought into contact with AA7075 type metal substrate, and analysed according to the general process described above. FIG. 1b shows that the combination provides results supporting advantages provided by the combination, which are particularly synergistic across various concentration ranges.

Example 5a $CeCl_3.7H_2O$ and Compound 16 was prepared and transferred to the eighty-eighty well PDMS brought into contact with AA2024 type metal substrate, and analysed according to the general process described above. FIG. 2a shows that the combination provides results supporting advantages provided by the combination, which are particularly synergistic across various concentration ranges.

Example 5b $ZnCl_2$ and Compound 16 was prepared and transferred to the eighty-eighty well PDMS brought into contact with AA2024 type metal substrate, and analysed according to the general process described above. FIG. 2a shows that the combination provides results supporting advantages provided by the combination, which are particularly synergistic across various concentration ranges.

Example 6a $CeCl_3.7H_2O$ and Compound 17 was prepared and transferred to the eighty-eighty well PDMS brought into contact with AA2024 type metal substrate, and analysed according to the general process described above. FIG. 2a shows that the combination provides results supporting advantages provided by the combination, which are particularly synergistic across various concentration ranges.

Example 6b $ZnCl_2$ and Compound 17 was prepared and transferred to the eighty-eighty well PDMS brought into contact with AA2024 type metal substrate, and analysed according to the general process described above. FIG. 2a shows that the combination provides results supporting advantages provided by the combination, which are particularly synergistic across various concentration ranges.

Example 7a $CeCl_3.7H_2O$ and Compound 12 was prepared and transferred to the eighty-eighty well PDMS brought into contact with AA2024 type metal substrate, and analysed according to the general process described above. FIG. 2b shows that the combination provides results supporting advantages provided by the combination, which are particularly synergistic across various concentration ranges.

Example 7b $ZnCl_2$ and Compound 12 was prepared and transferred to the eighty-eighty well PDMS brought into contact with AA2024 type metal substrate, and analysed according to the general process described above. FIG. 2b shows that the combination provides results supporting advantages provided by the combination, which are particularly synergistic across various concentration ranges.

Example 8a $CeCl_3.7H_2O$ and Compound 13 was prepared and transferred to the eighty-eighty well PDMS brought into contact with AA2024 type metal substrate, and analysed according to the general process described above. FIG. 2b shows that the combination provides results supporting advantages provided by the combination, which are particularly synergistic across various concentration ranges.

Example 8b $ZnCl_2$ and Compound 13 was prepared and transferred to the eighty-eighty well PDMS brought into contact with AA2024 type metal substrate, and analysed according to the general process described above. FIG. 2b shows that the combination provides results supporting advantages provided by the combination, which are particularly synergistic across various concentration ranges.

General Procedure for the Polarisation Resistance Electrochemical Tests

The corrosion inhibitor composition includes a mixture of at least one metal with at least one corrosion inhibiting agent of Formula 1, as described herein. Each metal was added into solution of 0.1 M NaCl in deionised water at a concentration of $10^{-3}$ M, $5\times10^{-4}$ M, $2\times10^{-4}$ M, $10^{-4}$ M, $5\times10^{-5}$ M, $2\times10^{-5}$ M, and $10^{-5}$ M. Each corrosion inhibiting agent was added into solution of 0.1 M NaCl in deionised water at a concentration of $10^{-3}$ M, $5\times10^{-4}$ M, $2\times10^{-4}$ M, $10^{-4}$ M, $5\times10^{-5}$ M, $2\times10^{-5}$ M, and $10^{-5}$ M.

The metal substrate (3 cm×3 cm surface area) was abraded using fine grade 3M Scotchbrite. Metal substrates, for example AA2024 and AA7075, were rinsed with deionised water and air dried. A titanium mesh and saturated calomel electrode (SCE) constituted the counter and reference electrodes respectively to be coupled with the working electrode to form a standard 3-electrode cell. Each corrosion inhibitor composition was left at an open circuit potential (OCP) period of 5 minutes prior to starting the polarisation scan. Linear polarization was measured over a potential range of ±10 mV vs. OCP at a scan rate of 0.167 mV/s every hour for 168 hours. Values of polarization resistance, $R_p$, were deduced from the slope of fitted current density vs. potential lines. The tests were performed in 180 ml solutions open to air for 168 hours. The polarisation experiments were performed using a 16 channel-VMP3 (variable multichannel potentiostat) with the EC-lab software v10.4.

Example 9

Figure 3:
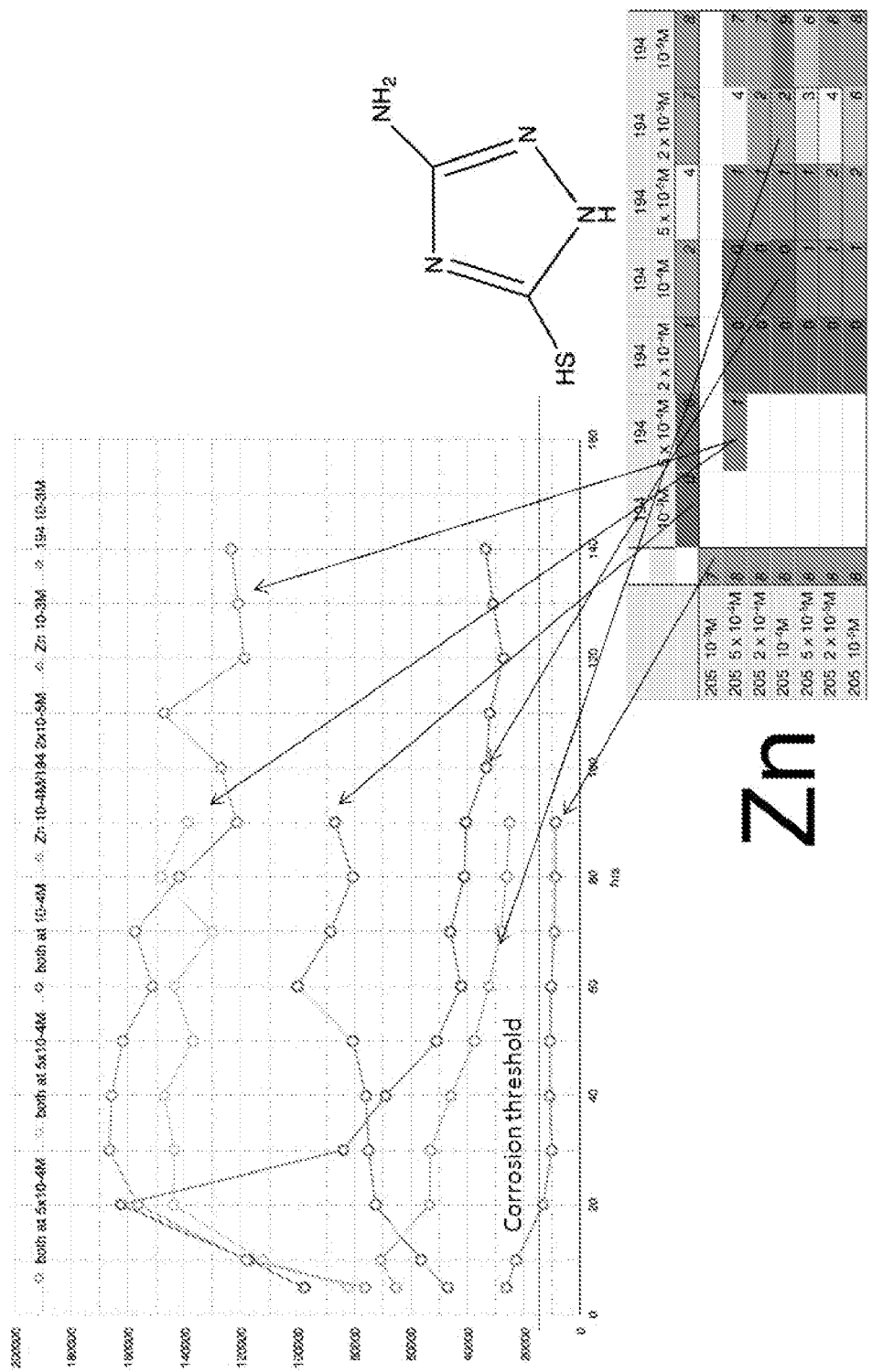
FIG. 3 is a graph showing polarisation resistance electrochemical experiments performed on a copper-containing aluminium alloy, AA2024, for a selection of corrosion inhibitor compositions.

$ZnCl_2$ and Compound 17 was prepared and analysed according to the general process described above. The metal substrate was AA2024 and prepared as described above. FIG. 3 shows that the combination provides an unexpected synergistic result over the individual components.

Example 10

$ZnCl_2$ and Compound 17 was prepared and analysed according to the general process described above. The metal substrate was AA7075 and prepared as described above.

Example 11

$CeCl_3.7H_2O$ and Compound 23 was prepared at a concentration of $10^{-4}$ M and analysed according to the general procedure described above. $PrCl_3.6H_2O$ and Compound 23 was prepared at a concentration of $10^{-4}$ M and analysed according to the general procedure described above. The metal substrate was AA2024 and prepared as described above. The combinations were compared to the industry standard corrosion inhibitor, $K_2Cr_2O_7$, solution of 0.1 M NaCl at $10^{-4}$ M. The results observed from the combinations were shown to have significantly enhanced corrosion inhibition properties over the industry standard corrosion inhibitor.

Example 12

$CeCl_3.7H_2O$ and Compound 23 was prepared at a concentration of $10^{-4}$ M and analysed according to the general procedure described above. $PrCl_3.6H_2O$ and Compound 23 was prepared at a concentration of $10^{-4}$ M and analysed according to the general procedure described above. The metal substrate was AA7075 and prepared as described above. The combinations were compared to the industry standard corrosion inhibitor, $K_2Cr_2O_7$, solution of 0.1 M NaCl at $10^{-4}$ M. The results observed from the combinations were shown to have significantly enhanced corrosion inhibition properties over the industry standard corrosion inhibitor.

Example 13

$CeCl_3.7H_2O$ was prepared at a concentration of $10^{-4}$ M and Compound 23 was prepared at a concentration of $2\times10^{-5}$ M, and analysed according to the general procedure described above. $PrCl_3.6H_2O$ was prepared at a concentration of $10^{-4}$ M and Compound 23 was prepared at a concentration of $2\times10^{-5}$ M, and analysed according to the general procedure described above. The metal substrate was AA2024 and prepared as described above. The combinations were compared to the industry standard corrosion inhibitor, $K_2Cr_2O_7$, solution of 0.1 M NaCl at $10^{-4}$ M. The results observed from the combinations were shown to have significantly enhanced corrosion inhibition properties over the industry standard corrosion inhibitor.

Example 14

CeCl$_3$.7H$_2$O was prepared at a concentration of 10$^{-4}$ M and Compound 23 was prepared at a concentration of 2×10$^{-5}$ M, and analysed according to the general procedure described above. PrCl$_3$.6H$_2$O was prepared at a concentration of 10$^{-4}$ M and Compound 23 was prepared at a concentration of 2×10$^{-5}$ M, and analysed according to the general procedure described above. The metal substrate was AA7075 and prepared as described above. The combinations were compared to the industry standard corrosion inhibitor, K$_2$Cr$_2$O$_7$, solution of 0.1 M NaCl at 10$^{-4}$ M. The results observed from the combinations were shown to have significantly enhanced corrosion inhibition properties over the industry standard corrosion inhibitor.

The invention claimed is:

1. A method of protecting a substrate from corrosion comprising applying a corrosion inhibitor composition to a surface of a substrate, wherein the corrosion inhibitor composition comprises:
  at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Sc, and Zr; and
  at least one corrosion inhibiting agent selected from an organic heterocyclic compound of Formula 1:

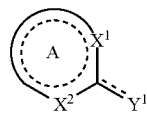

Formula 1 wherein:
  A is fused with one or more aryl or heteroaryl rings to form an imidazo-pyrazine, which is optionally substituted with one or more substituents, wherein a dotted line represents one or more optional double bonds;
  Y$^1$ is selected from the group consisting of S or SH, wherein the dotted line represents a double bond when Y$^1$ is S or is absent when Y$^1$ is SH;
  X$^1$ is selected from the group consisting of N, and NH;
  X$^2$ is selected from the group consisting of N and NR$^5$; and
  R$^5$ is selected from the group consisting of hydrogen, amino, C$_1$-C$_{10}$alkyl, C$_2$-C$_{10}$alkenyl, C$_2$-C$_{10}$alkynyl, aryl and heteroaryl, in which each amino, alkyl, alkenyl, alkynyl, aryl or heteroaryl group may be optionally substituted;
  wherein each of the metal salt or mixed metal salt and the corrosion inhibiting agent are provided as individual components in the composition and not a preformed metal-organic complex; and
  wherein the ratio of metal salt:corrosion inhibiting agent in the corrosion inhibitor composition is provided with an excess of the metal salt in comparison to the corrosion inhibiting agent.

2. The method of claim 1, wherein Y$^1$ is SH.
3. The method of claim 1, wherein X$^1$ is N.
4. The method of claim 1, wherein X$^2$ is NH.
5. The method of claim 1, wherein the metal is selected from the group consisting of La, Pr, Ce, Co, and Y.
6. The method of claim 1, wherein the metal is selected from the group consisting of Zn, Pr and Ce.
7. The method of claim 1, wherein the substrate is a copper-containing metal substrate.
8. The method of claim 1, wherein X$^2$ is NR$^5$.
9. The method of claim 1, wherein the imidazo-pyrazine is 1H-imidazo[4,5-b]pyrazine-2-thiol.

10. A method of protecting substrates from corrosion comprising:
  applying a corrosion inhibitor composition to a surface of a substrate wherein the corrosion inhibitor composition comprises:
    at least one metal salt or mixed metal salt, wherein the metal is selected from the group consisting of Zn, La, Pr, Ce, Nd, Sm, Eu, Gd, Tb, Dy, Ho, Er, Tm, Yb, Lu, Co, Y, Sc, and Zr; and
    at least one corrosion inhibiting agent selected from the group consisting of an organic heterocyclic compound of Formula 1:

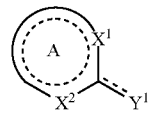

Formula 1 wherein
  A is fused with one or more aryl or heteroaryl rings to form an imidazo-pyrazine wherein a dotted line represents one or more optional double bonds;
  Y$^1$ is selected from the group consisting of S or SH, wherein the dotted line represents a double bond when Y$^1$ is S or is absent when Y$^1$ is SH;
  X$^1$ is selected from the group consisting of N and NH;
  X$^2$ is selected from the group consisting of N and NR$^5$; and
  R$^5$ is selected from the group consisting of hydrogen, amino, C$_1$-C$_{10}$alkyl, C$_2$-C$_{10}$alkenyl, C$_2$-C$_{10}$alkynyl, aryl and heteroaryl, in which each amino, alkyl, alkenyl, alkynyl, aryl or heteroaryl group may be optionally substituted;
  wherein each of the metal salt or mixed metal salt and the corrosion inhibiting agent are provided as individual components in the composition and not a preformed metal-organic complex; and
  wherein the ratio of metal salt:corrosion inhibiting agent in the corrosion inhibitor composition is provided with an excess of the metal salt in comparison to the corrosion inhibiting agent.

11. The method of claim 10, wherein Y$^1$ is SH.
12. The method of claim 10, wherein X$^1$ is N.
13. The method of claim 10, wherein X$^1$ is NH.
14. The method of claim 10, wherein X$^2$ is N.
15. The method of claim 10, wherein X$^2$ is NR$^5$.
16. The method of claim 10, wherein the metal is selected from the group consisting of La, Pr, Ce, Co, and Y.
17. The method of claim 10, wherein the metal is selected from the group consisting of Zn, Pr and Ce.
18. The method of claim 10, wherein the substrate is a copper-containing metal substrate.
19. The method of claim 10, wherein the imidazo-pyrazine is 1H-imidazo[4,5-b]pyrazine-2-thiol.

* * * * *

UNITED STATES PATENT AND TRADEMARK OFFICE
CERTIFICATE OF CORRECTION

PATENT NO. : 10,800,929 B2
APPLICATION NO. : 15/562826
DATED : October 13, 2020
INVENTOR(S) : James Ivan Mardel et al.

Page 1 of 1

It is certified that error appears in the above-identified patent and that said Letters Patent is hereby corrected as shown below:

On the Title Page

In item (54), in Column 1, in "Title", Line 1, delete "COMPOSITION" and insert -- COMPOSITIONS --, therefor.

In item (56), in Column 2, under "Other Publications", Lines 1-2, delete "PCT/AU201605245" and insert -- PCT/AU2016/05245 --, therefor.

In the Specification

In Column 1, Line 1, delete "COMPOSITION" and insert -- COMPOSITIONS --, therefor.

Signed and Sealed this
Eighth Day of December, 2020

Andrei Iancu
*Director of the United States Patent and Trademark Office*